(12) United States Patent
Farley (10) Patent No.: US 11,147,734 B2
(45) Date of Patent: Oct. 19, 2021

(54) ASSISTIVE PUSHCART DEVICE

(71) Applicant: Robert Farley, Huntington Beach, CA (US)

(72) Inventor: Robert Farley, Huntington Beach, CA (US)

( * ) Notice: Subject to any disclaimer, the term of this patent is extended or adjusted under 35 U.S.C. 154(b) by 97 days.

(21) Appl. No.: 16/591,708

(22) Filed: Oct. 3, 2019

(65) Prior Publication Data

US 2021/0100716 A1 Apr. 8, 2021

(51) Int. Cl.
*A61H 3/04* (2006.01)
*A61G 5/08* (2006.01)

(52) U.S. Cl.
CPC .............. *A61H 3/04* (2013.01); *A61G 5/0825* (2016.11); *A61H 2003/046* (2013.01)

(58) Field of Classification Search
CPC ... A61H 3/04; A61H 2003/046; A61G 5/0825
See application file for complete search history.

(56) References Cited

U.S. PATENT DOCUMENTS

| 4,021,033 | A | 5/1977 | Auclair |
| 4,226,413 | A | 10/1980 | Daugherty |
| 5,120,286 | A | 6/1992 | Twohig |
| 6,170,840 | B1 | 1/2001 | Mathias |
| 6,688,633 | B2 * | 2/2004 | van't Schip ............ A61H 3/04 |
| | | | 135/67 |
| 7,111,856 | B1 * | 9/2006 | Graham .................. A61H 3/04 |
| | | | 135/67 |
| 7,226,396 | B2 | 6/2007 | Buechel |
| 7,866,677 | B1 * | 1/2011 | Rothstein ................. A61H 3/04 |
| | | | 280/47.34 |
| 7,988,163 | B2 | 8/2011 | Accetta |
| D654,832 | S | 2/2012 | Pettersson |
| 9,314,395 | B1 * | 4/2016 | VanAusdall ......... B62B 5/0438 |
| 9,968,508 | B2 * | 5/2018 | Scherr ..................... A61H 3/04 |
| 10,293,202 | B2 * | 5/2019 | Hoobler ................. A63B 22/20 |
| 2001/0048206 | A1 * | 12/2001 | Niu .......................... A61H 3/04 |
| | | | 280/87.021 |
| 2002/0084617 | A1 * | 7/2002 | Torsiello ................. A61H 3/04 |
| | | | 280/250.1 |
| 2008/0079230 | A1 * | 4/2008 | Graham ............... A61G 5/0816 |
| | | | 280/87.041 |
| 2008/0284125 | A1 * | 11/2008 | Ramm .................. B62K 3/002 |
| | | | 280/263 |

(Continued)

FOREIGN PATENT DOCUMENTS

WO WO2006121404 11/2006

*Primary Examiner* — Brian L Swenson (57) ABSTRACT

An assistive pushcart device for rollerblading includes a set of first wheels and a set of second wheels that are rotationally coupled to a frame proximate to a front and a back of the frame, respectively. A handle that is coupled to and extends transversely from the back of the frame is configured to be grasped in one or two hands of a user to stabilize the user as the user locomotes the frame along a surface. Each of set of brakes is operationally coupled to a respective one of the first wheels and the second wheels. The set of brakes is positioned to selectively slow and stop rotation of at least one of the first wheels and the second wheels. An actuator that is coupled to the handle and operationally coupled to the set of brakes is positioned to selectively actuate the set of brakes.

14 Claims, 7 Drawing Sheets

(56) References Cited

U.S. PATENT DOCUMENTS

| | | | |
|---|---|---|---|
| 2010/0163087 A1* | 7/2010 | Catton | A61H 3/04 135/67 |
| 2016/0184167 A1* | 6/2016 | Naucke | A61G 5/10 280/47.4 |
| 2019/0209418 A1* | 7/2019 | VanAusdall | B62B 5/0438 |

* cited by examiner

ASSISTIVE PUSHCART DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to assistive devices and more particularly pertains to a new assistive device for rollerblading.

(2) Description of Related Art Including Information Disclosed Under 37 CFR 1.97 and 1.98

The prior art relates to assistive devices.

BRIEF SUMMARY OF THE INVENTION

An embodiment of the disclosure meets the needs presented above by generally comprising a set of first wheels and a set of second wheels that are rotationally coupled to a frame proximate to a front and a back of the frame, respectively. A handle that is coupled to and extends transversely from the back of the frame is configured to be grasped in one or two hands of a user to stabilize the user as the user locomotes the frame along a surface. Each of set of brakes is operationally coupled to a respective one of the first wheels and the second wheels. The set of brakes is positioned to selectively slow and stop rotation of at least one of the first wheels and the second wheels. An actuator that is coupled to the handle and operationally coupled to the set of brakes is positioned to selectively actuate the set of brakes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new assistive device embodying the principles and concepts of an embodiment of the disclosure and generally designated by the reference numeral 10 will be described.

Figure 6:
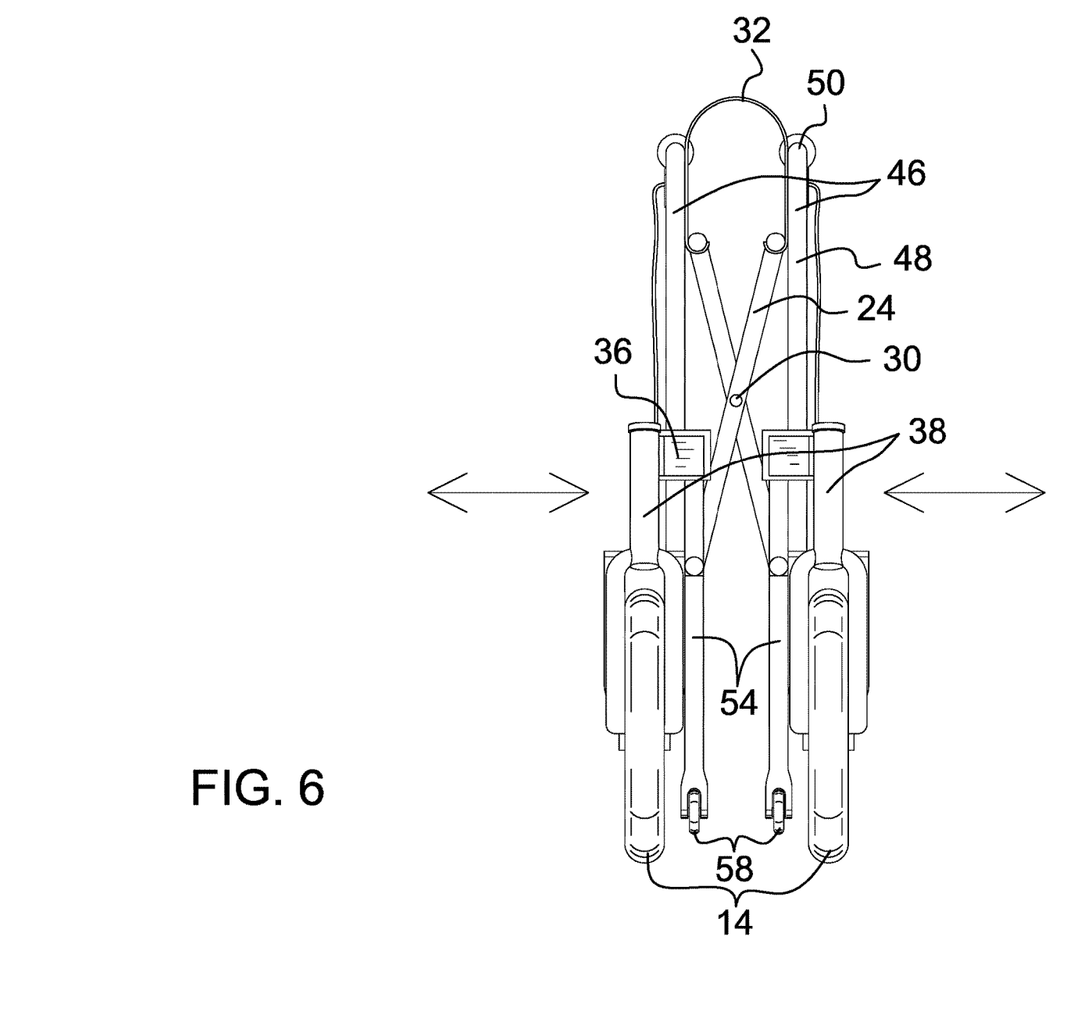
FIG. 6 is a front view of an embodiment of the disclosure.
Figure 7:
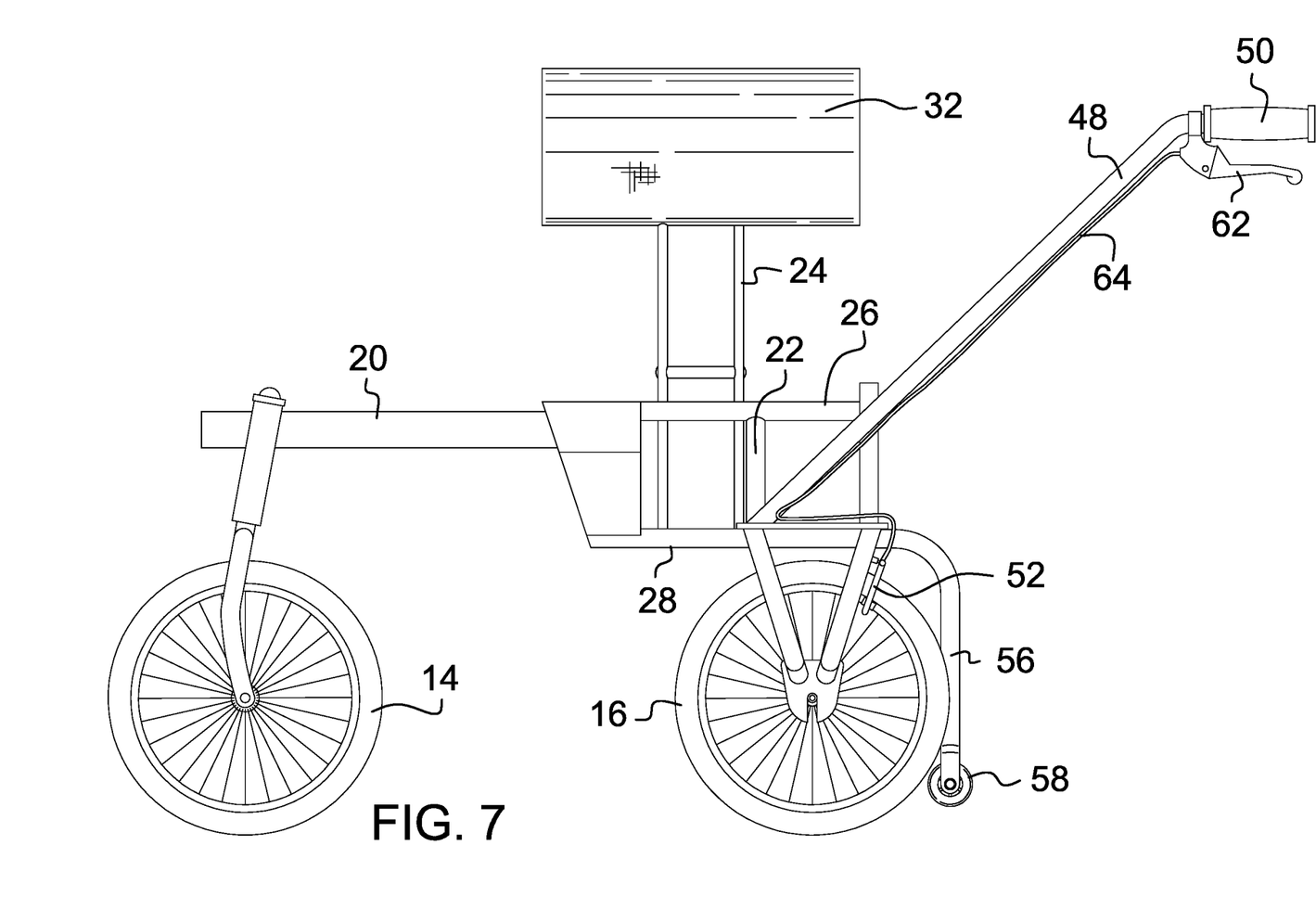
FIG. 7 is a side view of an embodiment of the disclosure.

As best illustrated in FIGS. 1 through 8, the assistive pushcart device 10 generally comprises a frame 12, a set of first wheels 14, and a set of second wheels 16. The frame 12 is foldable so that the frame 12 is selectively positionable in a deployed configuration as shown in FIGS. 1-5, wherein opposing side members 18 of the frame 12 are distally positioned, and a collapsed configuration, as shown in FIGS. 6 and 7, wherein the opposing side members 18 of the frame 12 are proximally positioned.

Each opposing side member 18 comprises a forward section 20 and a rearward section 22. The rearward section 22 is substantially open rectangularly shaped. The forward section 20 is coupled to an extends coplanarly from the rearward section 22. Each cross brace 24 of two pairs of cross braces 24 is pivotally coupled to a lower limit 28 of one of the rearward sections 22. The cross brace 24 extends to and is removably couplable to an upper limit 26 of the other rearward section 22. Each pair of cross braces 24 is X-shaped when the frame 12 is positioned in the deployed configuration so that the two pairs of cross braces 24 are positioned to retain the opposing side members 18 in a parallel planar orientation.

Figure 2:
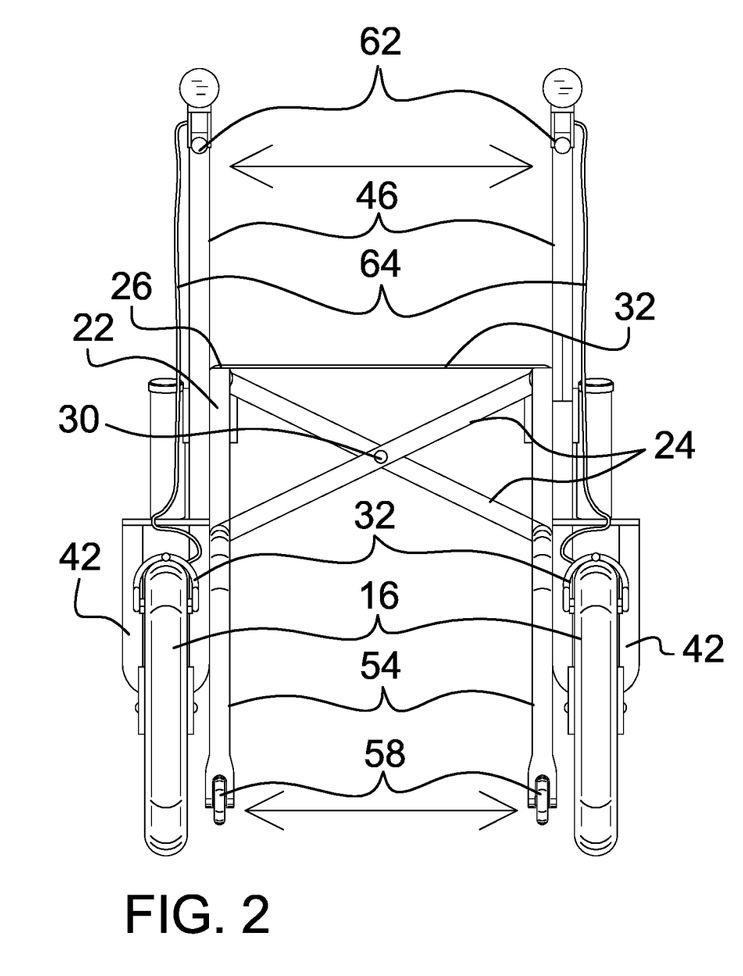
FIG. 2 is a rear view of an embodiment of the disclosure.
Figure 3:
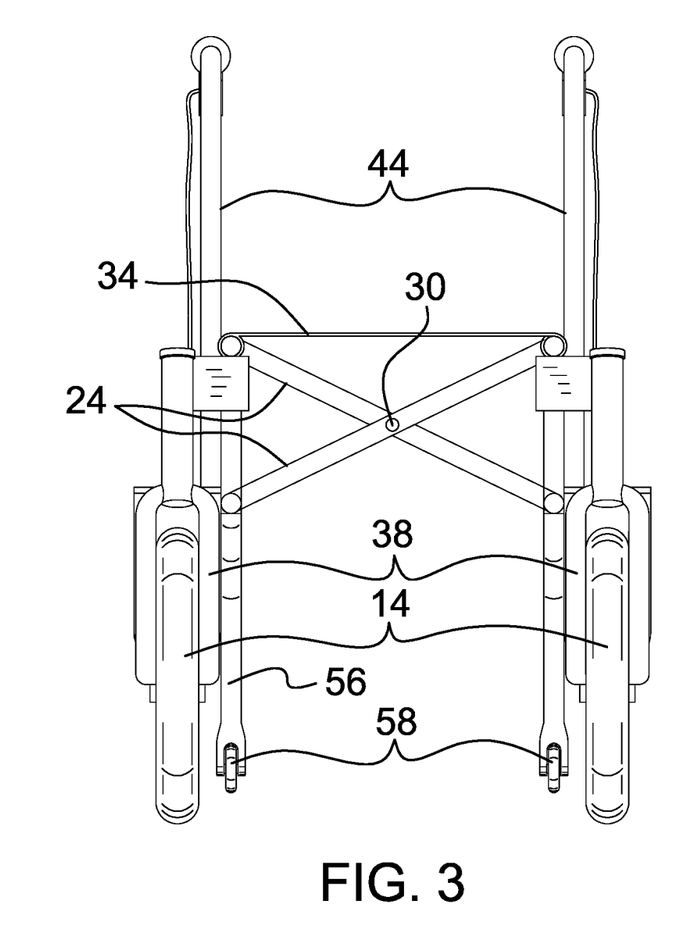
FIG. 3 is a front view of an embodiment of the disclosure.
Figure 4:
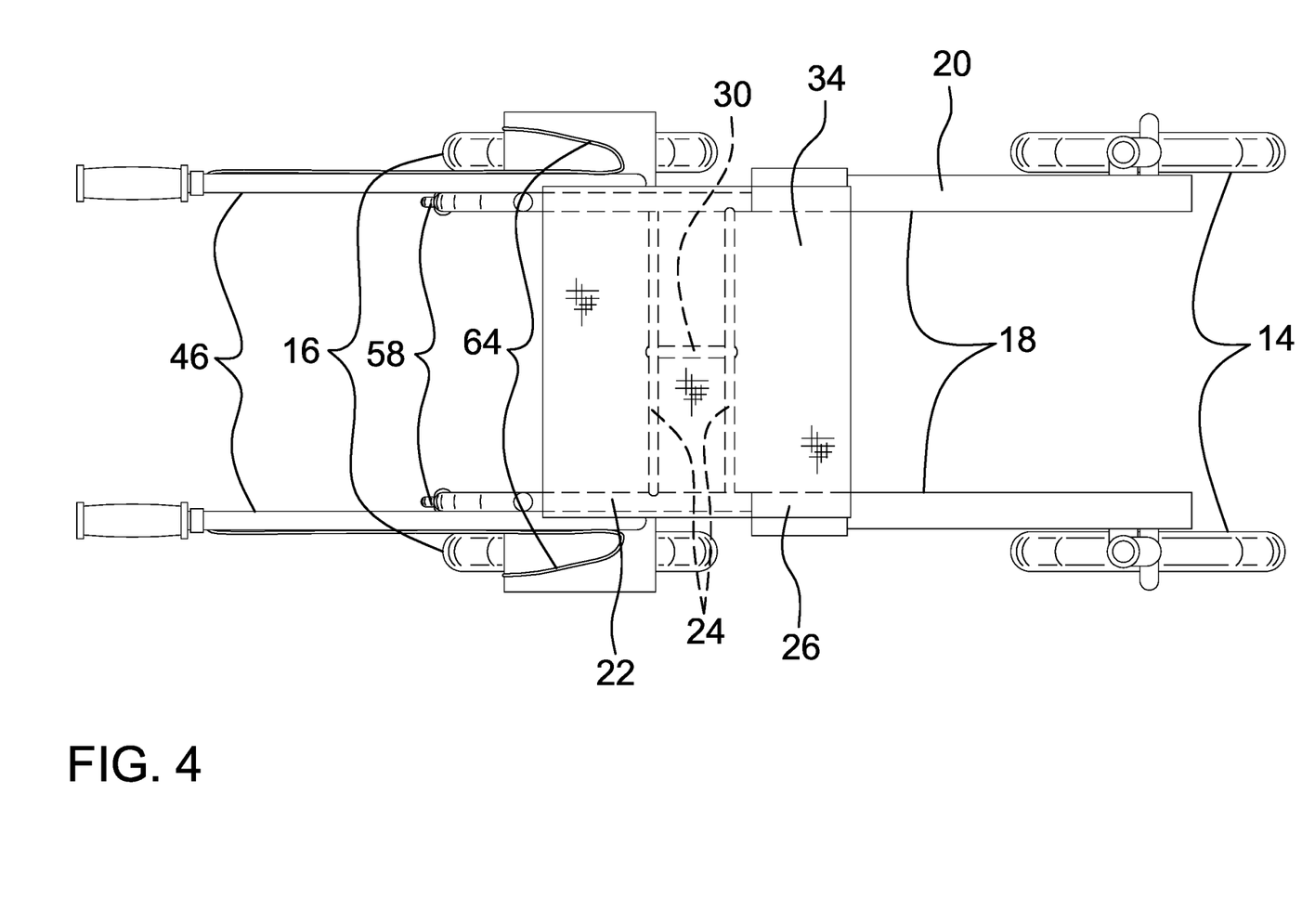
FIG. 4 is a top view of an embodiment of the disclosure.
Figure 5:
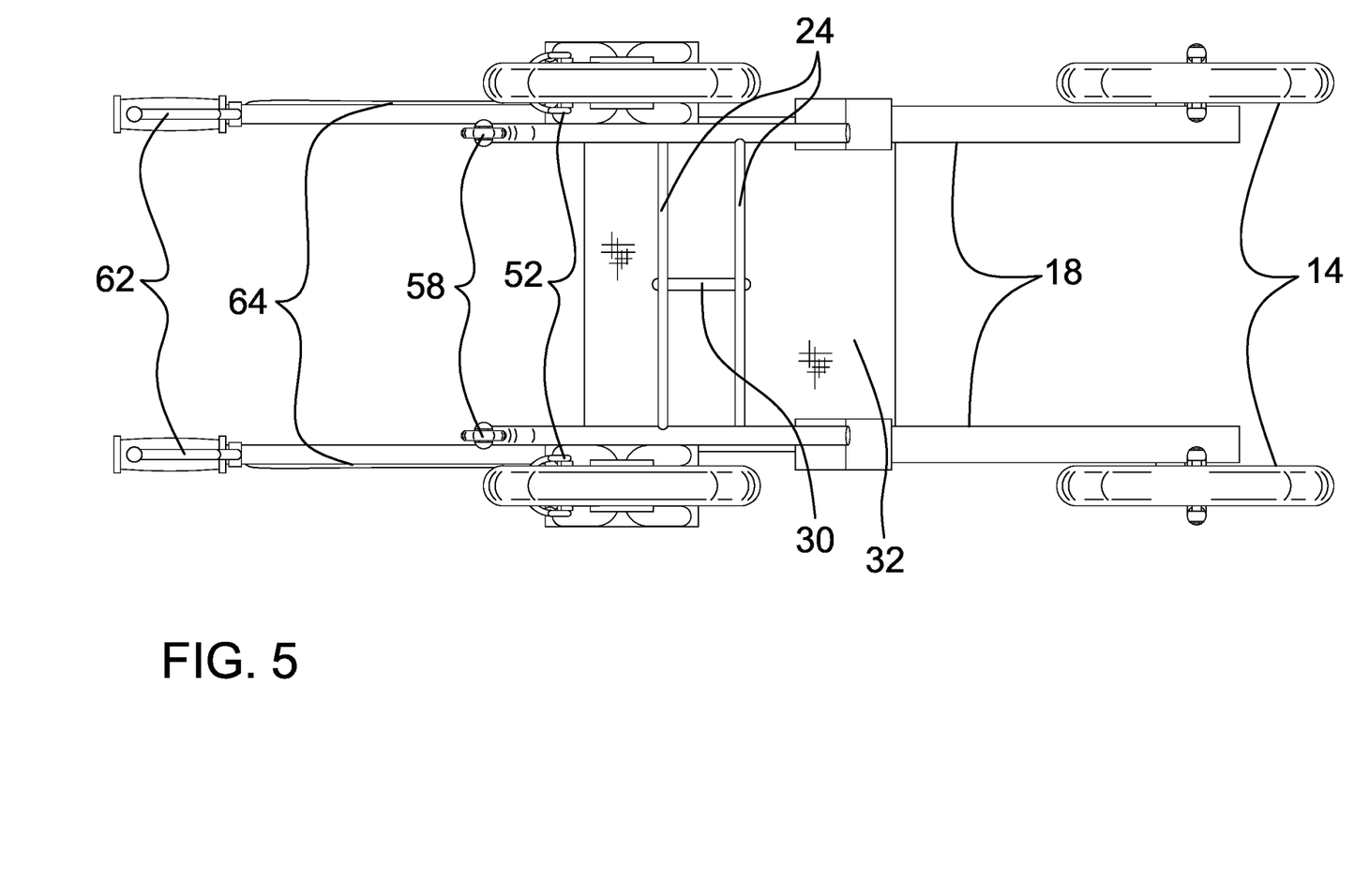
FIG. 5 is a bottom view of an embodiment of the disclosure.

A pivot rod 30 is rotationally coupled to and extends between the pairs of cross braces 24 equally distant from the rearward sections 22 so that the cross braces 24 are selectively pivotable to position the frame 12 in the deployed configuration and the collapsed configuration. A panel 32 that is coupled to and extends between the upper limits 26 of the rearward sections 22 forms a seat 34 when the frame 12 is in the deployed configuration, as shown in FIGS. 2-4.

The set of first wheels 14 is rotationally coupled to the frame 12 proximate to a front 36 of the frame 12. The set of first wheels 14 may comprise two first wheels 14 that are coupled singly to the opposing side members 18 of the frame 12. The present invention also anticipates the set of first wheels 14 comprising one first wheel 14.

Figure 1:
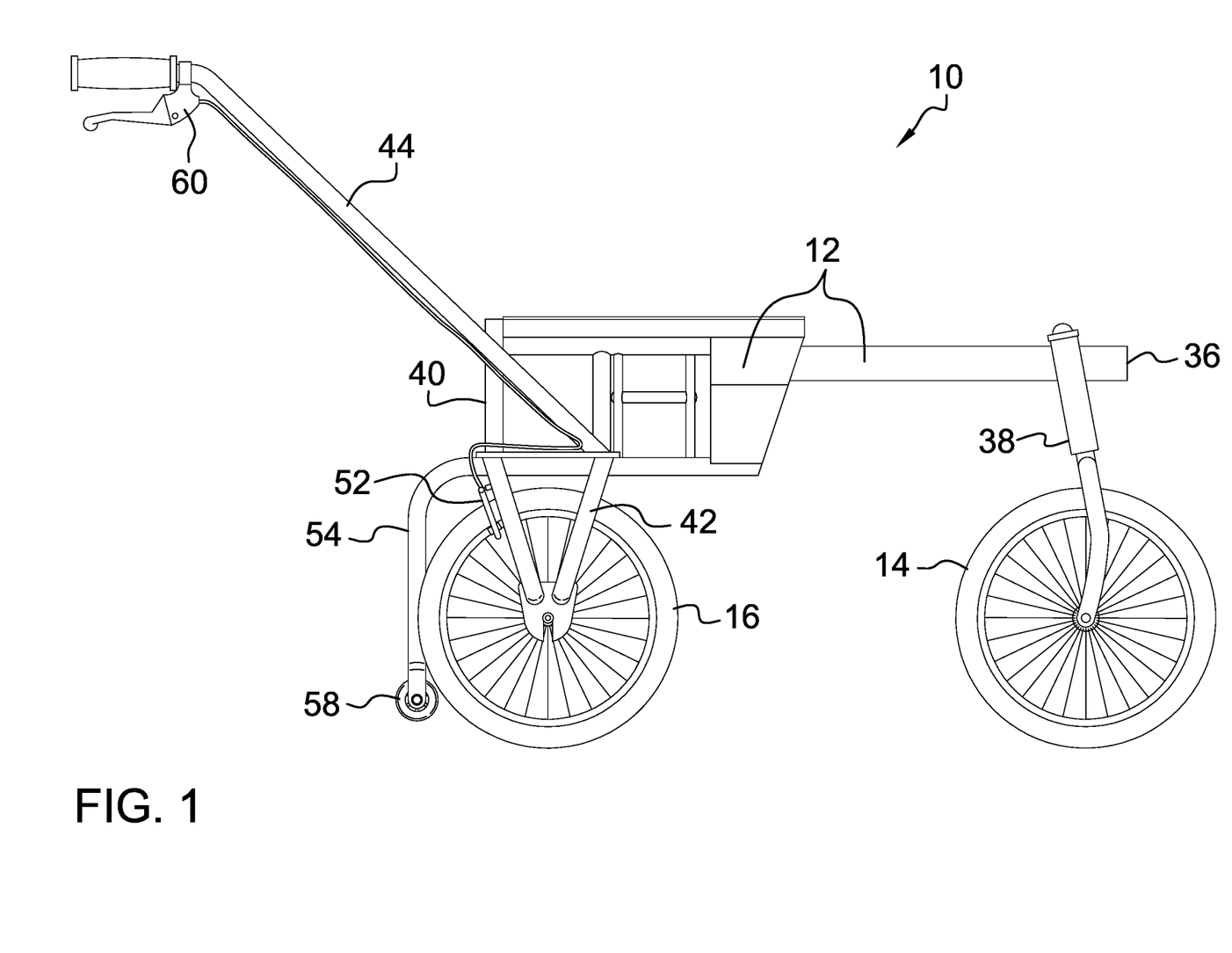
FIG. 1 is a side view of an assistive pushcart device according to an embodiment of the disclosure.

Each of a set of first forks 38 is coupled to and positioned between the frame 12 and a respective first wheel 14 so that the respective first wheel 14 is positioned below the frame 12. The first forks 38 may be suspension type, as shown in FIG. 1, so that the first forks 38 are configured to absorb a shock that is imparted to the first wheels 14 when rolling over an uneven surface. The first forks 38 may be double blade type, as shown in FIG. 3. The present invention also anticipates the first forks 38 being single blade type.

The set of second wheels 16 is rotationally coupled to the frame 12 proximate to a back 40 of the frame 12. The set of second wheels 16 comprises two second wheels 16 that are coupled singly to the opposing side members 18 of the frame 12. The second wheels 16 and the first wheels 14 may be wire-spoke type, as shown in FIG. 1.

Each of a set of second forks 42 is coupled to and positioned between the frame 12 and a respective second wheel 16 so that the respective second wheel 16 is positioned below the frame 12. The second forks 42 may be substantially inverted V-shaped, as shown in FIG. 7. The second forks 42 may be double blade type, as shown in FIG. 2. The present invention also anticipates the second forks 42 being single blade type.

Figure 8:
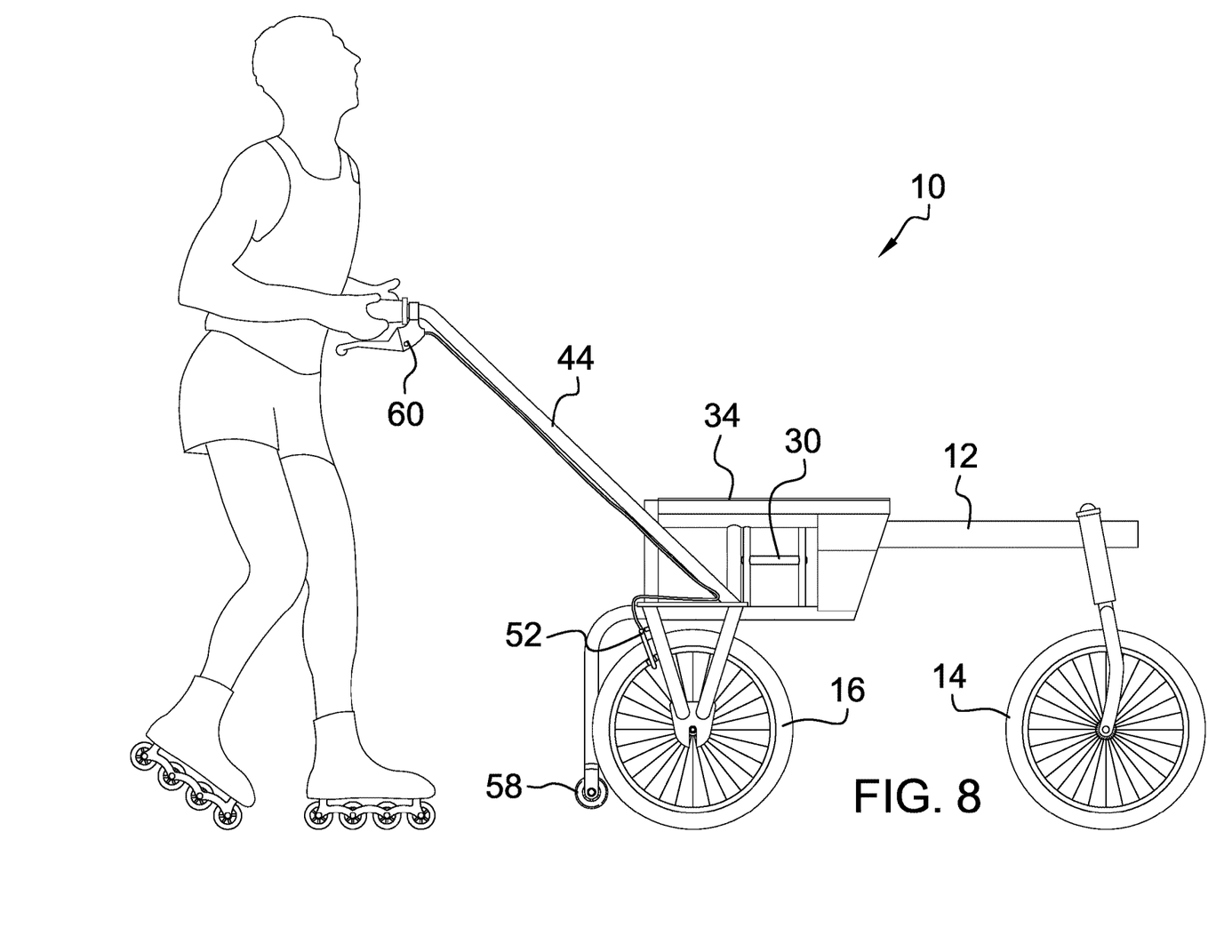
FIG. 8 is an in-use view of an embodiment of the disclosure.

A handle 44 that is coupled to and which extends transversely from the back 40 of the frame 12 is configured to be grasped in one or two hands of a user to stabilize the user as the user locomotes the frame 12 along a surface, as shown in FIG. 8. The device 10 is anticipated to be of benefit in assisting a user in roller blading and running, particularly if the user has a stability deficit, as might occur with amputees, a user with a traumatic brain injury, and the like.

The handle 44 comprises a pair of tubes 46. Each tube 46 comprises a first section 48 that extends transversely from a respective opposing side member 18 and a second section 50 that extends transversely from the first section 48 so that the second section 50 is substantially parallel planar with the frame 12. The second section 50 is configured to be grasped in a respective hand of the user.

Each of set of brakes 52 is operationally coupled to a respective one of the first wheels 14 and the second wheels 16. The set of brakes 52 is positioned to selectively slow and stop rotation of at least one of the first wheels 14 and the second wheels 16. The brakes 52 may be caliper type, as shown in FIG. 2. The present invention also anticipates the brakes 52 being disc type. The set of brakes 52 may comprise two brakes 52 that are operationally coupled to the second wheels 16, as shown in FIG. 2.

The device 10 also comprises a set of rods 54, which are substantially L-shaped. Each rod 54 is coupled to and extends from the back 40 of the frame 12 so that a distal segment 56 of the rod 54 is substantially perpendicular to the frame 12. The set of rods 54 may comprise two rods 54 that are coupled singly to the opposing side members 18, as shown in FIG. 2. Each of a set of third wheels 58 is rotationally coupled to a respective rod 54 distal from the frame 12. The third wheel 58 is configured to contact the surface when the set of first wheels 14 is elevated from the surface to deter tipping of the frame 12. The third wheels 58 provide added stability to the device 10.

An actuator 60 that is coupled to the handle 44 and operationally coupled to the set of brakes 52 is positioned to selectively actuate the set of brakes 52. The ability of the user to slow and to stop the device 10 when utilizing the device 10 while roller blading provides an added level of safety. The actuator 60 may comprise a pair of levers 62 and a pair of cables 64, or other type of manual actuating means and electronic actuating means. Each lever 62 is pivotally coupled to the second section 50 of a respective tube 46. Each cable 64 is coupled to and extends between a respective lever 62 and an associated brake 52. The lever 62 is configured to be pivoted toward the second section 50 so that the cable 64 actuates the associated brake 52. The cable 64 may be positioned externally to the handle 44 and the frame 12, as shown in FIG. 7. The present invention also anticipates the cable 64 being positioned within the handle 44 and the frame 12.

In use, the device 10 is positioned in the deployed configuration, enabling the user to grasp the handle 44 and to enjoy added stability while roller blading and running. The set of brakes 52 assists the user in coming to a stop, while the seat 34 is available to the user during rest breaks.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An assistive pushcart device comprising:
    a frame;
    a set of first wheels rotationally coupled to the frame proximate to a front of the frame;
    a set of second wheels rotationally coupled to the frame proximate to a back of the frame;
    a handle coupled to and extending transversely from the back of the frame wherein the handle is configured for grasping in one or two hands of a user for stabilizing the user as the user locomotes the frame along a surface;
    a set of brakes, each brake being operationally coupled to a respective one of the first wheels and the second wheels such that the set of brakes is positioned for selectively slowing and stopping rotation of at least one of the first wheels and the second wheels;
    an actuator coupled to the handle, the actuator being operationally coupled to the set of brakes such that the actuator is positioned for selectively actuating the set of brakes;
    the set of first wheels comprising two first wheels coupled singly to opposing side members of the frame;
    the set of second wheels comprising two second wheels coupled singly to the opposing side members of the frame;
    the handle comprising a pair of tubes, each tube comprising a first section extending transversely from a respective opposing side member and a second section extending transversely from the first section such that the second section is substantially parallel planar with the frame wherein the second section is configured for grasping in a respective hand of the user.

2. The device of claim 1, further including the frame being foldable such that the frame is selectively positionable in a deployed configuration wherein opposing side members of the frame are distally positioned and a collapsed configuration wherein the opposing side members of the frame are proximally positioned.

3. The device of claim 1, further including the first wheels and the second wheels being wire-spoke type.

4. The device of claim 1, further comprising:
a set of first forks, each first fork being coupled to and positioned between the frame and a respective first wheel such that the respective first wheel is positioned below the frame; and
a set of second forks, each second fork being coupled to and positioned between the frame and a respective second wheel such that the respective second wheel is positioned below the frame.

5. The device of claim 4, further including the first forks and the second forks being double blade type.

6. The device of claim 1, further including the brakes being caliper type.

7. The device of claim 1, further including the set of brakes comprising two brakes operationally coupled to the second wheels.

8. The device of claim 1, further comprising:
a set of rods, the rods being substantially L-shaped, each rod being coupled to and extending from the back of the frame such that a distal segment of the rod is substantially perpendicular to the frame; and
a set of third wheels, each third wheel being rotationally coupled to a respective rod distal from the frame such that the third wheel is configured for contacting the surface when the set of first wheels is elevated from the surface for deterring tipping of the frame.

9. The device of claim 1, further including the actuator comprising a pair of levers and a pair of cables, each lever being pivotally coupled to the second section of a respective tube, each cable being coupled to and extending between a respective lever and an associated brake wherein the lever is configured for pivoting toward the second section such that the cable actuates the associated brake.

10. An assistive pushcart device comprising:
a frame;
a set of first wheels rotationally coupled to the frame proximate to a front of the frame;
a set of second wheels rotationally coupled to the frame proximate to a back of the frame;
a handle coupled to and extending transversely from the back of the frame wherein the handle is configured for grasping in one or two hands of a user for stabilizing the user as the user locomotes the frame along a surface;
a set of brakes, each brake being operationally coupled to a respective one of the first wheels and the second wheels such that the set of brakes is positioned for selectively slowing and stopping rotation of at least one of the first wheels and the second wheels;
an actuator coupled to the handle, the actuator being operationally coupled to the set of brakes such that the actuator is positioned for selectively actuating the set of brakes;
the frame being foldable such that the frame is selectively positionable in a deployed configuration wherein opposing side members of the frame are distally positioned and a collapsed configuration wherein the opposing side members of the frame are proximally positioned;
each opposing side member comprising a forward section and a rearward section, the rearward section being substantially open rectangularly shaped, the forward section being coupled to an extending coplanarly from the rearward section;
two pairs of cross braces, each cross brace being pivotally coupled to a lower limit of one of the rearward sections, the cross brace extending to and being removably couplable to an upper limit of the other rearward section such that each pair of cross braces is X-shaped when the frame is positioned in the deployed configuration such that the two pairs of cross braces are positioned for retaining the opposing side members in a parallel planar orientation; and
a pivot rod rotationally coupled to and extending between the pairs of cross braces equally distant from the rearward sections such that the cross braces are selectively pivotable for positioning the frame in the deployed configuration and the collapsed configuration.

11. The device of claim 10, further including a panel coupled to and extending between the upper limits of the rearward sections wherein the panel forms a seat when the frame is in the deployed configuration.

12. An assistive pushcart device comprising:
a frame;
a set of first wheels rotationally coupled to the frame proximate to a front of the frame;
a set of second wheels rotationally coupled to the frame proximate to a back of the frame;
a handle coupled to and extending transversely from the back of the frame wherein the handle is configured for grasping in one or two hands of a user for stabilizing the user as the user locomotes the frame along surface;
a set of brakes, each brake being operationally coupled to a respective one of the first wheels and the second wheels such that the set of brakes is positioned for selectively slowing and stopping rotation of at least one of the first wheels and the second wheels;
an actuator coupled to the handle, the actuator being operationally coupled to the set of brakes such that the actuator is positioned for selectively actuating the set of brakes;
a set of first forks, each first fork being coupled to and positioned between the frame and a respective first wheel such that the respective first wheel is positioned below the frame;
a set of second forks, each second fork being coupled to and positioned between the frame and a respective second wheel such that the respective second wheel is positioned below the frame;
the first forks being suspension type wherein the first forks are configured for absorbing a shock imparted to the first wheels when rolling over an uneven surface; and
the second forks being substantially inverted V-shaped.

13. An assistive pushcart device comprising:
a frame;
a set of first wheels rotationally coupled to the frame proximate to a front of the frame;

a set of second wheels rotationally coupled to the frame proximate to a back of the frame;
a handle coupled to and extending transversely from the back of the frame wherein the handle is configured for grasping in one or two hands of a user for stabilizing the user as the user locomotes the frame along a surface;
a set of brakes, each brake being operationally coupled to a respective one of the first wheels and the second wheels such that the set of brakes is positioned for selectively slowing and stopping rotation of at least one of the first wheels and the second wheels;
an actuator coupled to the handle, the actuator being operationally coupled to the set of brakes such that the actuator is positioned for selectively actuating the set of brakes;
a set of rods, the rods being substantially L-shaped, each rod being coupled to and extending from the back of the frame such that a distal segment of the rod is substantially perpendicular to the frame;
a set of third wheels, each third wheel being rotationally coupled to a respective rod distal from the frame such that the third wheel is configured for contacting the surface when the set of first wheels is elevated from the surface for deterring tipping of the frame; and
the set of rods comprising two rods coupled singly to opposing side members of the frame.

14. An assistive pushcart device comprising:
a frame, the frame being foldable such that the frame is selectively positionable in a deployed configuration wherein opposing side members of the frame are distally positioned and a collapsed configuration wherein the opposing side members of the frame are proximally positioned, each opposing side member comprising a forward section and a rearward section, the rearward section being substantially open rectangularly shaped, the forward section being coupled to an extending coplanarly from the rearward section;
two pairs of cross braces, each cross brace being pivotally coupled to a lower limit of one of the rearward sections, the cross brace extending to and being removably couplable to an upper limit of the other rearward section such that each pair of cross braces is X-shaped when the frame is positioned in the deployed configuration such that the two pairs of cross braces are positioned for retaining the opposing side members in a parallel planar orientation;
a pivot rod rotationally coupled to and extending between the pairs of cross braces equally distant from the rearward sections such that the cross braces are selectively pivotable for positioning the frame in the deployed configuration and the collapsed configuration;
a panel coupled to and extending between the upper limits of the rearward sections wherein the panel forms a seat when the frame is in the deployed configuration;
a set of first wheels rotationally coupled to the frame proximate to a front of the frame, the set of first wheels comprising two first wheels coupled singly to the opposing side members of the frame, the first wheels being wire-spoke type;
a set of first forks, each first fork being coupled to and positioned between the frame and a respective first wheel such that the respective first wheel is positioned below the frame, the first forks being suspension type wherein the first forks are configured for absorbing a shock imparted to the first wheels when rolling over an uneven surface, the first forks being double blade type;
a set of second wheels rotationally coupled to the frame proximate to a back of the frame, the set of second wheels comprising two second wheels coupled singly to the opposing side members of the frame, the second wheels being wire-spoke type;
a set of second forks, each second fork being coupled to and positioned between the frame and a respective second wheel such that the respective second wheel is positioned below the frame, the second forks being substantially inverted V-shaped, the second forks being double blade type;
a handle coupled to and extending transversely from the back of the frame wherein the handle is configured for grasping in one or two hands of a user for stabilizing the user as the user locomotes the frame along a surface, the handle comprising a pair of tubes, each tube comprising a first section extending transversely from a respective opposing side member and a second section extending transversely from the first section such that the second section is substantially parallel planar with the frame wherein the second section is configured for grasping in a respective hand of the user;
a set of brakes, each brake being operationally coupled to a respective one of the first wheels and the second wheels such that the set of brakes is positioned for selectively slowing and stopping rotation of at least one of the first wheels and the second wheels, the brakes being caliper type, the set of brakes comprising two brakes operationally coupled to the second wheels;
a set of rods, the rods being substantially L-shaped, each rod being coupled to and extending from the back of the frame such that a distal segment of the rod is substantially perpendicular to the frame, the set of rods comprising two rods coupled singly to the opposing side members;
a set of third wheels, each third wheel being rotationally coupled to a respective rod distal from the frame such that the third wheel is configured for contacting the surface when the set of first wheels is elevated from the surface for deterring tipping of the frame; and
an actuator coupled to the handle, the actuator being operationally coupled to the set of brakes such that the actuator is positioned for selectively actuating the set of brakes, the actuator comprising a pair of levers and a pair of cables, each lever being pivotally coupled to the second section of a respective tube, each cable being coupled to and extending between a respective lever and an associated brake wherein the lever is configured for pivoting toward the second section such that the cable actuates the associated brake.

* * * * *